United States Patent
Lee (10) Patent No.: US 7,342,698 B2
(45) Date of Patent: Mar. 11, 2008

(54) LIGHT SCANNING UNIT AND IMAGE FORMING APPARATUS HAVING THE SAME

(75) Inventor: Dong-hun Lee, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 57 days.

(21) Appl. No.: 11/455,094

(22) Filed: Jun. 19, 2006

(65) Prior Publication Data

US 2006/0291025 A1    Dec. 28, 2006

(30) Foreign Application Priority Data

Jun. 23, 2005  (KR) ............. 10-2005-0054654

(51) Int. Cl.
*G02B 26/08* (2006.01)
(52) U.S. Cl. .................................... 359/196
(58) Field of Classification Search ......... 359/196–218
See application file for complete search history.

(56) References Cited

U.S. PATENT DOCUMENTS 7,133,176 B2 * 11/2006 Abe ........................... 359/204
7,184,185 B2 * 2/2007 Tamaru et al. .............. 359/204

FOREIGN PATENT DOCUMENTS

| JP | 62-098309 | 5/1987 |
|----|-----------|--------|
| JP | 63-299535 | 12/1988 |
| JP | 07-064153 | 3/1995 |
| JP | 07-081136 | 3/1995 |
| JP | 08-220318 | 8/1996 |

* cited by examiner

*Primary Examiner*—Euncha P. Cherry
(74) *Attorney, Agent, or Firm*—Roylance, Abrams, Berdo & Goodman, L.L.P.

(57) ABSTRACT

A laser scanning unit and a light source unit employed in the same are provided. The laser scanning unit forms a linear latent image by scanning a light beam onto a photoreceptor. The laser scanning unit includes a light source generating and radiating a light beam. An aperture substrate faces the light source and has a curved reflection surface that includes an opening and faces the light source and reflects a light beam incident on the reflection surface around the opening away from the incident axis. A beam deflector is disposed on the optical path between the aperture substrate and the photoreceptor to deflect the portion of the light beam that has passed through the aperture substrate and scans the light in a scanning direction of the photoreceptor.

20 Claims, 7 Drawing Sheets

LIGHT SCANNING UNIT AND IMAGE FORMING APPARATUS HAVING THE SAME

CROSS-REFERENCE TO RELATED PATENT APPLICATION

This application claims the benefit under 35 U.S.C. § 119(a) of Korean Patent Application No. 10-2005-0054654, filed on Jun. 23, 2005, in the Korean Intellectual Property Office, the entire disclosure of which is hereby incorporated by reference.

BACKGROUND OF THE INVENTION

1. Field of the Invention

The present invention relates to a laser scanning unit and an image forming apparatus having the same. More particularly, the present invention relates to a laser scanning unit and an image forming apparatus having the same in which the interference caused by light that is removed during shaping and the inflow of the removed light into an optical system are substantially prevented and the productivity of the optical components is improved.

2. Description of the Related Art

Generally, a laser scanning unit (LSU) is employed in laser printers, digital photocopiers, bar code readers, and facsimiles, and forms a latent image by scanning with a beam deflector and sub-scanning through rotation of a photoreceptor.

Figure 1:
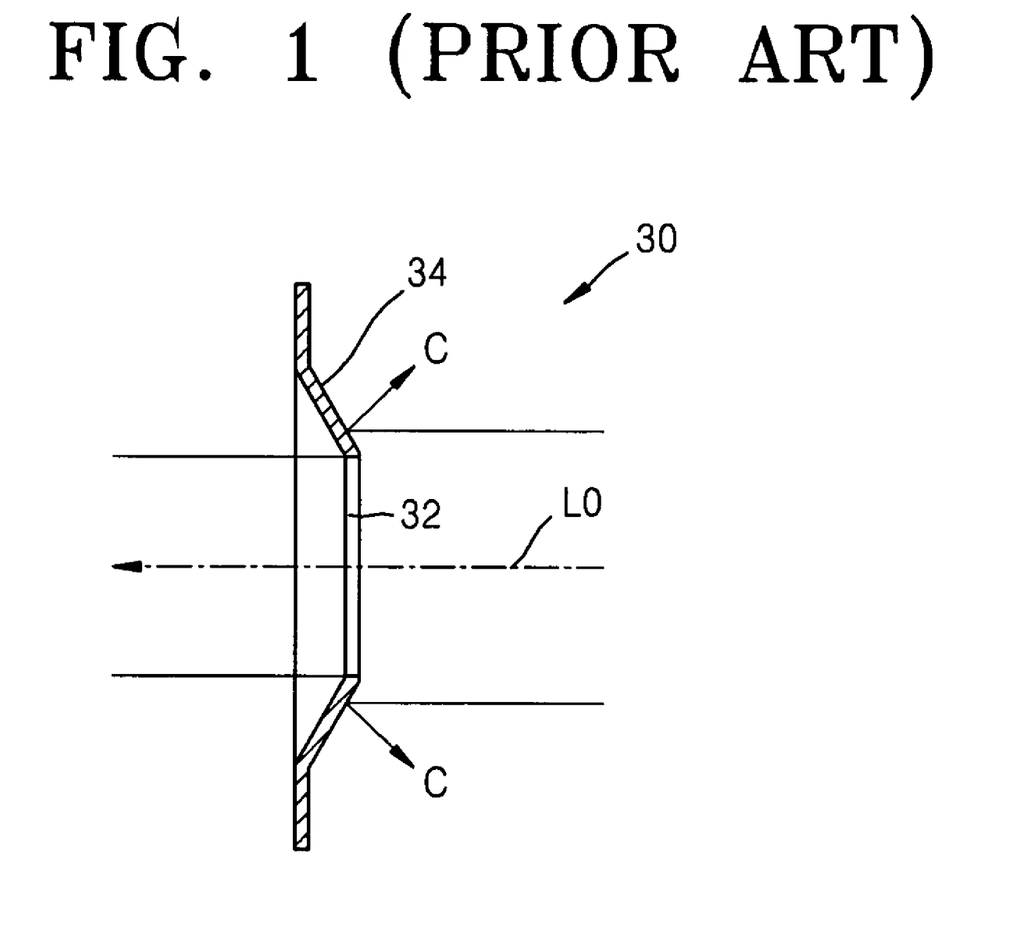
FIG. 1 is an elevational view in cross section of a conventional laser scanning unit.

FIG. 1 illustrates main elements of a conventional LSU. Referring to FIG. 1, in the conventional LSU, divergent laser light emitted from a laser light source (not shown) is collimated by a collimating lens (not shown). A portion of the collimated light passes through a throttle member 30 including an aperture 32 to pass a portion of a light beam, and thus the light beam forms an optimal light spot on a photoconductor (not shown). The portion of the light beam not transmitted by the throttle member 30 is reflected by a tapered surface 34 of the throttle member 30 and proceeds away from the optical axis $L_O$. The tapered surface 34 is inclined with respect to the cross section of the light beam and reflects incident light away from the optical axis $L_O$ so that reflected light C does not return to the collimating lens. Thus, a decrease of light power and image quality due to light concentration on a laser light source or an unnecessary image formed on a photoconductor is prevented.

The throttle member 30 including the tapered surface 34 may be produced in large quantities using a press process. However, when a tapered edge is made using a press process, stress concentrates locally in a material disposed between an upper die and a lower die, and thus inferior products may be produced since plasticity flow is blocked, and the edge portions may be easily cut or thin.

Accordingly, a need exists for an improved light source for a laser scanning unit in which light removed during beam shaping is not reflected onto optical components.

SUMMARY OF THE INVENTION

The present invention provides a laser scanning unit and an image forming apparatus having the same in which light removed during beam shaping is not reflected back on other optical components, thereby substantially preventing an unnecessary image and overheating of a light source. Additionally, the production of defective optical components may be decreased, and thus the laser scanning unit has an improved manufacturing yield.

According to an aspect of the present invention, there is provided a laser scanning unit (LSU) that forms a linear latent image by scanning a light beam onto a photoreceptor. The laser scanning unit includes a light source generating and radiating a light beam. An aperture substrate faces the light source and has a curved reflection surface that includes an opening and faces the light source and reflects a light beam incident on the reflection surface around the opening away from the incident axis. A beam deflector is disposed on the optical path between the aperture substrate and the photoreceptor to deflect the portion of the light beam that has passed through the aperture substrate and scans the light in a scanning direction of the photoreceptor.

The laser scanning unit may further include a first lens disposed on the optical path between the light source and the aperture substrate to collimate divergent light from the light source. The reflection surface may reflect the incident beam so that the reflected light is not incident on the first lens.

The reflection surface may be curved away from the light source or toward the light source.

The reflection mirror may have a curved surface in which the radius of the depressed circle is less than the radius of the opening circle.

The opening may extend in the scanning direction of the light beam.

A second lens may be disposed on the optical path between the aperture substrate and the beam deflector to focus the light beam through the aperture substrate onto the beam deflector.

A scanning optical lens may be disposed on the optical path between the aperture substrate and the photoreceptor to focus light in the scanning direction with different magnifications to form an image on the photoreceptor.

According to another aspect of the present invention, a light source unit provides a light beam shaped in a predetermined shape. The light source unit includes a base frame having a guide channel extending in the direction in which the light beam proceeds. A circuit substrate is coupled to the back of the base frame. A light emitting device is mounted on the circuit substrate and radiates the light beam forwardly. An aperture substrate faces the light source, has a curved reflection surface that has an opening and faces the light source, passes through a light beam incident on the opening, and reflects the rest of the light beam incident on the reflection surface away from the incident axis. A first lens is installed on the guide channel between the light emitting device and the aperture substrate to collimate the light beam.

The first lens may be installed on the guide channel via a lens holder that is in the form of a hollow cylinder surrounding the first lens. The lens holder may be installed to be movable along the guide channel.

The base frame may include a first portion to which the circuit substrate is installed and a second portion in which the guide channel is formed, and main surfaces of the first and second portions are substantially perpendicular to each other.

The reflection surface may be curved away from the light emitting device or toward the light emitting device. The reflection surface may have a curved surface in which the radius of a depressed circle is less than the radius of the opening circle.

Other objects, advantages and salient features of the invention will become apparent from the following detailed description, which taken in conjunction with the annexed drawings, discloses exemplary embodiments of the invention.

BRIEF DESCRIPTION OF THE DRAWINGS

The above and other features and advantages of the present invention will become more apparent by describing in detail exemplary embodiments thereof with reference to the attached drawings in which.

Throughout the drawings, like reference numerals will be understood to refer to like parts, components and structures.

DETAILED DESCRIPTION OF EXEMPLARY EMBODIMENTS

Figure 2:
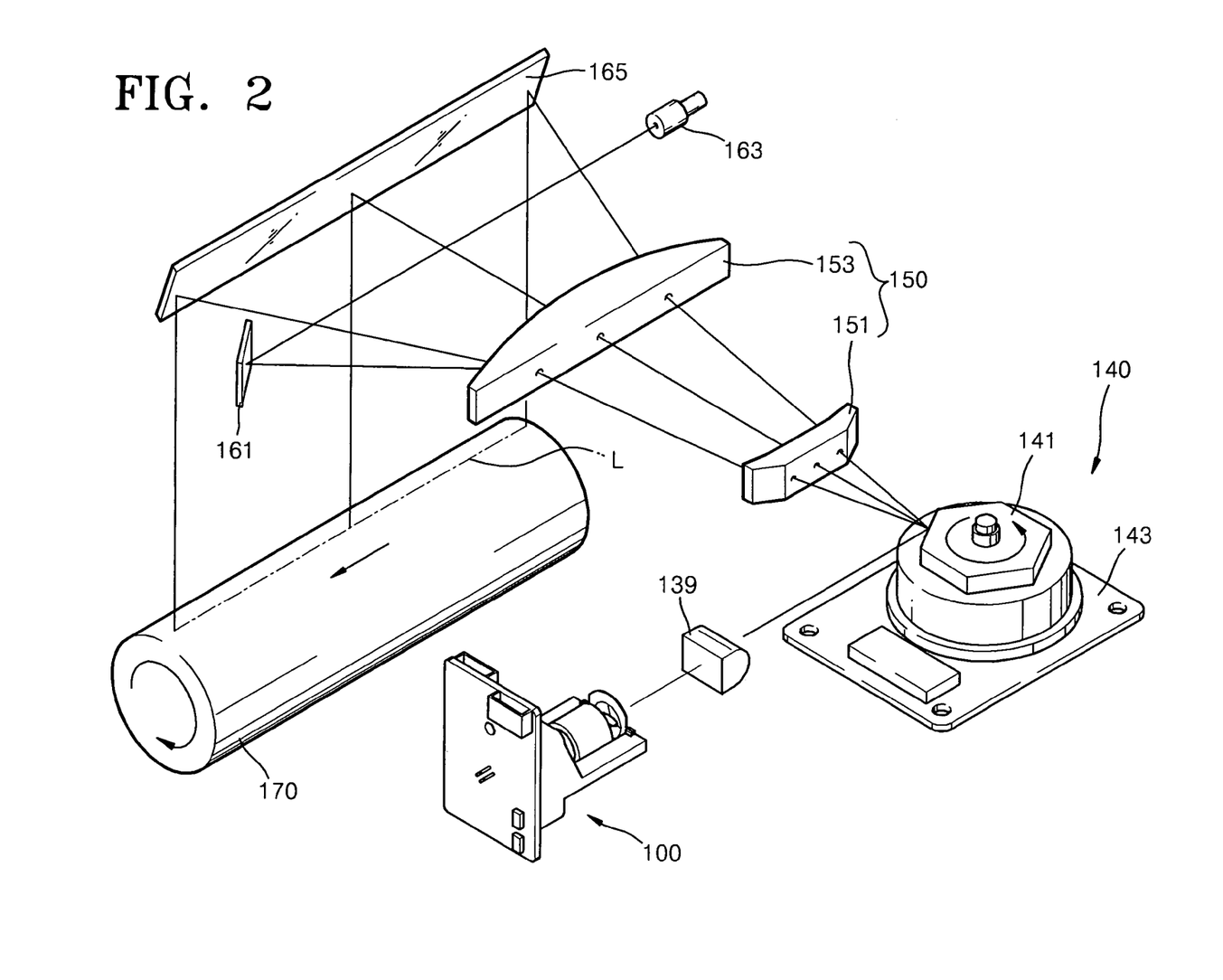
FIG. 2 is a perspective view of a laser scanning unit (LSU) according to an exemplary embodiment of the present invention.

The present invention will now be described more fully with reference to the accompanying drawings, in which exemplary embodiments of the present invention are shown. FIG. 2 is a perspective view schematically illustrating the structure of a laser scanning unit according to an exemplary embodiment of the present invention. The laser scanning unit includes a light source unit 100 generating and radiating light. A beam deflector 140 deflects the light emitted from the light source 100 to scan the light onto a photoreceptor 170. A scanning optical lens 150 adjusting the magnification of the deflected light to focus the light on the photoreceptor 170 along a main scanning direction.

The light source unit 100 radiates a light beam shaped in a predetermined form. The beam deflector 140 deflects the light radiated from the light source unit 100 to scan the light in the main scanning direction on the photoreceptor 170 and includes a driving source 143 and a polygonal mirror 141, which is rotated at a high speed by the driving source 143. The main scanning direction is the direction in which a light beam is scanned by the beam deflector 140, referring to a scanning line L on the photoreceptor 170. The sub-scanning direction refers to the rotation direction of the photoreceptor 170. The polygonal mirror 141 includes a plurality of reflection mirrors formed on the sides of a polygonal structure.

A second lens 139 is disposed between the light source unit 100 and the beam deflector 140 and functions as a cylindrical lens. The light beam emitted from the light source 100 is concentrated in a sub-scanning direction by the second lens 139 and focused on a mirror surface of the beam deflector 140.

The light beam is reflected from the beam deflector 140 to be scanned in the main scanning direction and focused by a scanning optical lens 150, also known as an F-θ lens, along the main scanning direction with different magnifications. Accordingly, the incident beam is focused on the photoreceptor 170 as a linear latent image. For this purpose, the optical scanning lens 150 includes two optical lenses 151 and 153 that have a form that changes continuously in the main scanning direction. After being concentrated by the scanning optical lens 150, the path of the light beam is converted by a reflection mirror 165 and guided onto the photoreceptor 170. A synchronization mirror 161 and an optical sensor 163 receiving the light reflected by the synchronization mirror 161 are disposed between the scanning optical lens 150 and the reflection mirror 165 to synchronize the image data of the latent image with a scanning line L.

Figure 3:
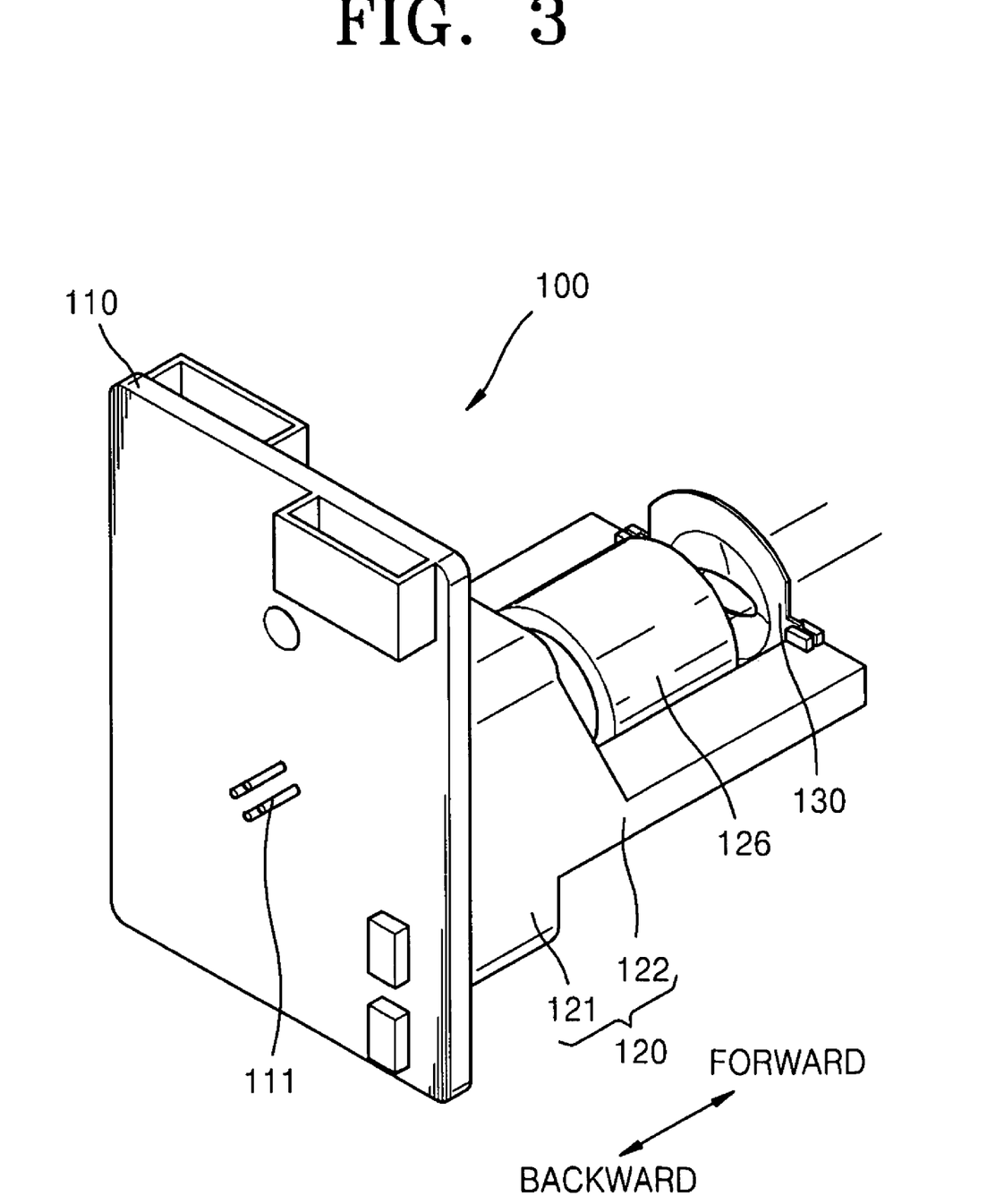
FIGS. 3 and 4 are rear and front perspective views of a light source unit of FIG. 2.
Figure 4:
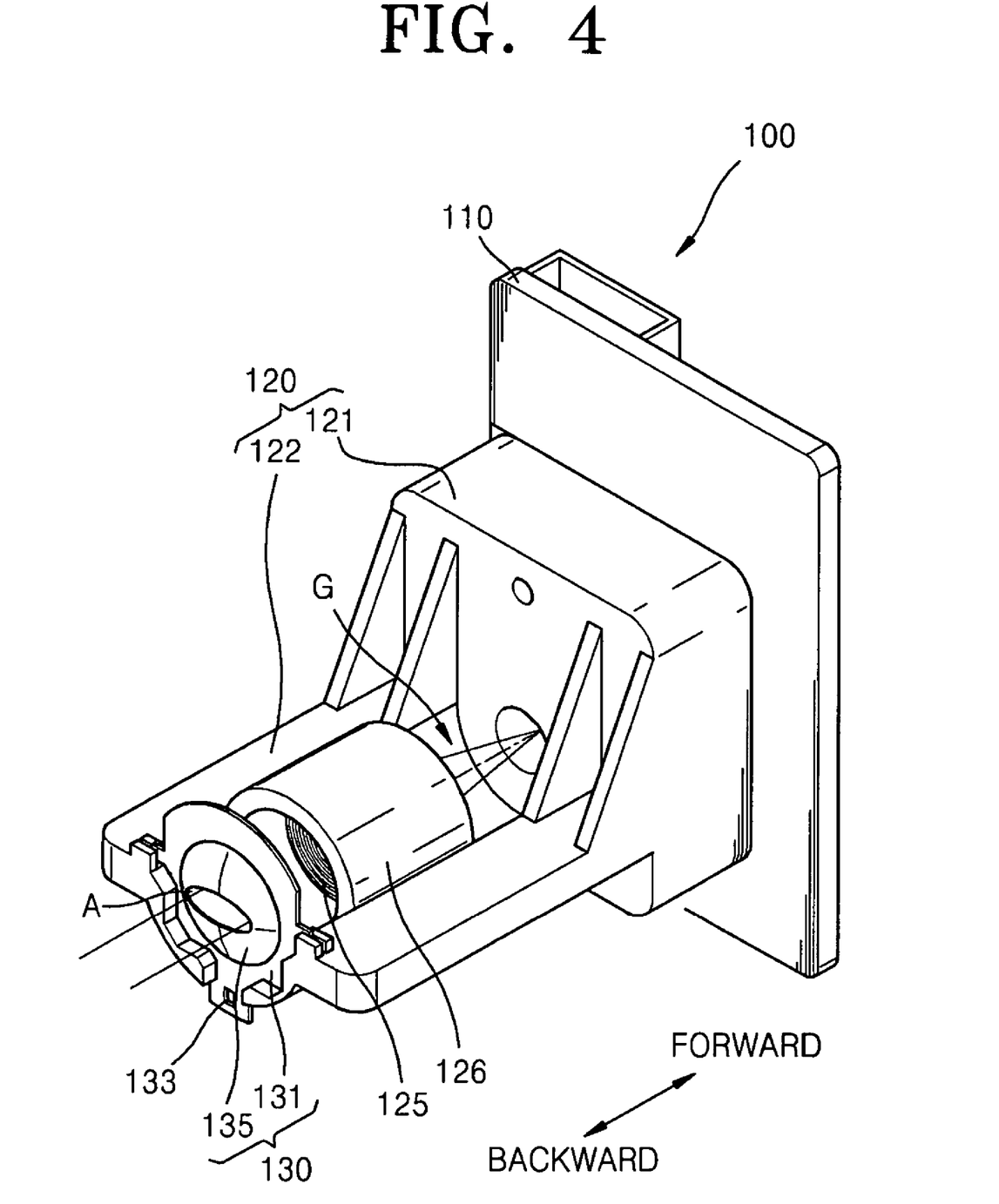

FIGS. 3 and 4 are rear and front perspective views illustrating the light source unit 100 of FIG. 2. Referring to FIGS. 3 and 4, the light source unit 100 includes a base frame 120, a circuit substrate 110 coupled to the back of the base frame 120, an aperture substrate 130 installed in the base frame 120, and a lens holder 126.

The base frame 120 includes a first portion 121 that is coupled to the circuit substrate 110 and a second portion 122 that extends substantially perpendicularly from the first portion 121. The second portion 122 includes a guide channel G formed as a half cylinder in the light proceeding direction. The base frame 120 supports other elements of the light source unit 110.

The circuit substrate 110 is installed at the back of the base frame 120. A light emitting device 111 and several electric components for providing controlled driving power are mounted on the circuit substrate 110. The light emitting device 111 may be a laser diode (LD), which is well known in the art. A light beam generated by the light emitting device 111 is emitted along the guide channel G formed on the base frame 120.

Optical components that shape the light beam emitted from the light emitting device into a predetermined form are mounted along of the guide channel G. The aperture substrate 130 is disposed at the exit of the guide channel G. The aperture substrate 130 includes a curved reflection mirror 135 in which an opening A is formed and a ring-shaped supporting member 131 surrounding the curved reflection mirror 135 for installation of the reflection mirror 135 onto the base frame 120. A plurality of connection elements 133 protrude from the ring-shaped supporting member 131. The connection elements 133 are coupled with an installation slot of the base frame 120 to connect the ring-shaped supporting member 131 to the base frame 120.

The curved reflection mirror 135 transmits only a portion of the incident light beam from the light emitting device 111 to form a beam with a predetermined cross-section and reflects the rest of the light beam away from the optical axis so as not to re-enter the scanning optical system. An opening A in the shape of an oval (or ellipse) extending in the main scanning direction is formed in the center of the curved reflection mirror 135. When passing through the opening A, the light beam is shaped to extend in the main scanning direction.

A lens holder 126 is disposed at the back of the aperture substrate 130. The lens holder 126 is, for example, a hollow cylinder. A first lens 125 collimating the light diverged from the light emitting device 111 is fixed in the lens holder 126. The first lens 125 is fixed by the lens holder 126 and mounted in the guide channel G.

Figure 5:
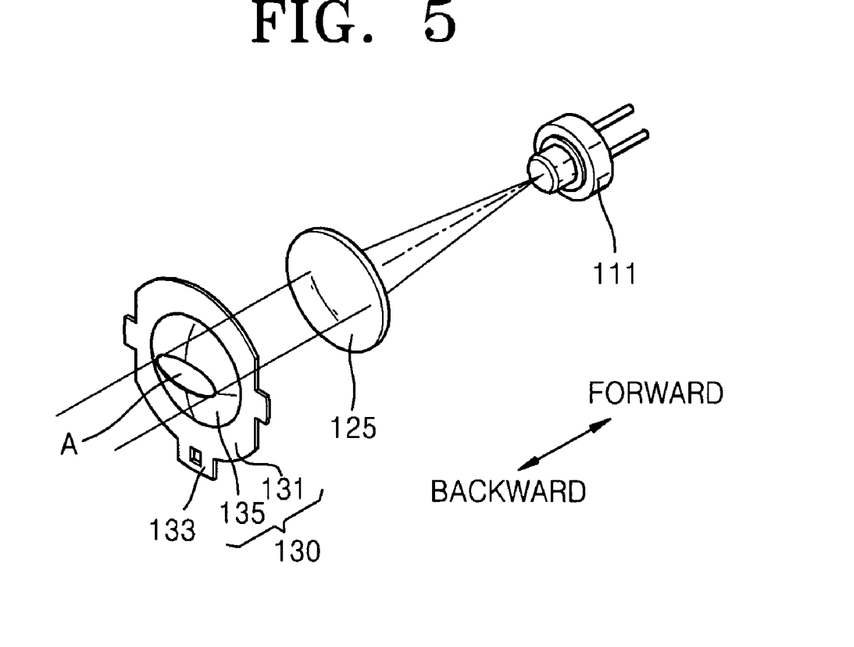
FIG. 5 is a perspective view of optical components of the light source unit of FIG. 4.

FIG. 5 is a perspective view of optical components of the light source unit 100 of FIG. 4. Referring to FIG. 5, a divergent light beam emitted from the light emitting device 111 passes through the first lens 125 and is converted into a parallel beam, which is incident on the aperture substrate 130. The light beam that passes through the opening A is substantially elliptical with a greater width in the main scanning direction and travels along the optical path shown in FIG. 2 to be scanned onto the photoreceptor 170.

Figure 6:
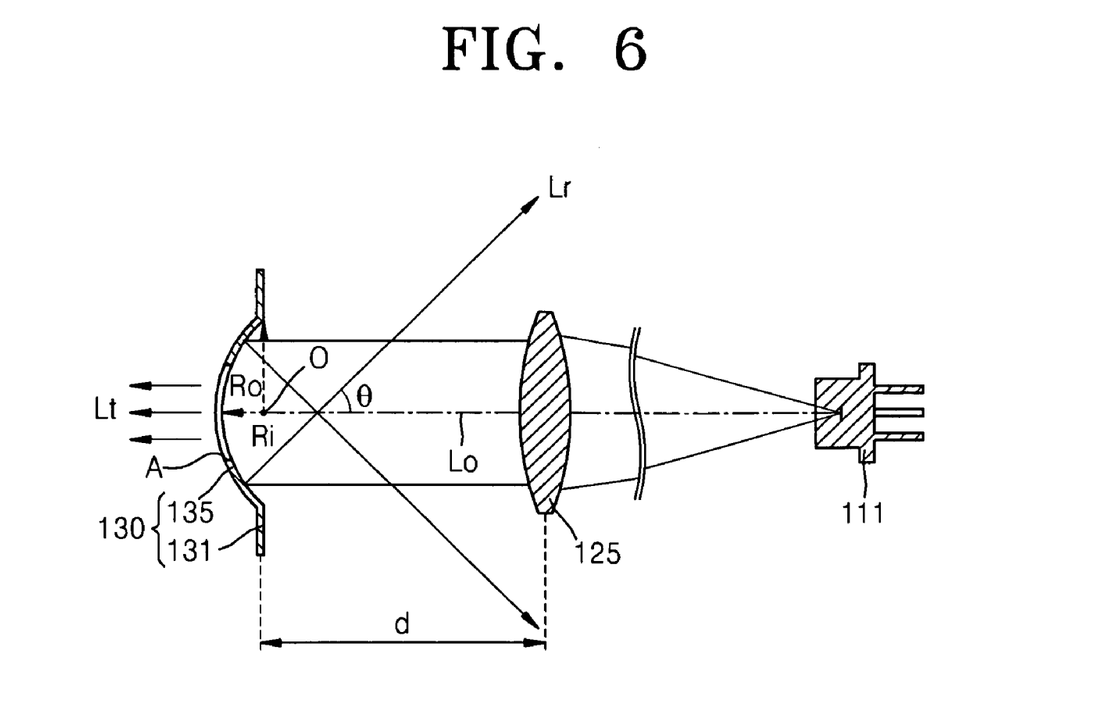
FIG. 6 is an elevational view in cross section of the optical components of FIG. 5.

The portion of the light beam incident on the curved reflection mirror 135 surrounding the opening A is reflected outward from the first lens 125 by the curved reflection mirror 135, and is not incident on the first lens 125. The curved reflection mirror 135 protrudes in the direction the light beam travels, that is, away from the light emitting device 111. FIG. 6 is a cross-sectional view illustrating how the curved reflection mirror 135 functions. Of the light beams incident on the aperture substrate 130, a portion of the light beam incident on the opening A proceeds forward and a portion of the light beam incident on the curved reflection mirror 135 is reflected outward with a predetermined angle with respect to the optical axis $L_O$. In an exemplary implementation, the aperture substrate 130 is spaced from the first lens 125 by at least a distance such that the reflected light Lr is not incident on the first lens 125. In an exemplary embodiment, a lens holder 126 is movably installed along the guide channel G, and thus alignment may be simplified. The curved reflection mirror 135 may be symmetric about the optical axis $L_O$. For example, the curved reflection mirror may have a convex surface in which the distance between the center O of the opening circle $R_O$ and the reflection surface continuously changes so that the radius of the depressed circle Ri is smaller than that of the opening circle $R_O$. Because the angle θ at which the reflected light Lr travels away from the light axis $L_O$ varies according to the curved form of the reflection mirror 135, the distance d between the aperture 130 and the first lens 125 is adjusted in accordance with the form of the curved reflection mirror 135.

The curved reflection mirror 135 may be produced in large quantities with a highly reflective material, such as aluminum, stainless steel, or silver using a press process. The reflection surface of the incident side is, for example, coated with glass. In an exemplary embodiment, the curved reflection mirror 135 has a curved form for good plasticity flow of the material used for manufacturing in a press process, and defects resulting from stress concentration along the edges are substantially prevented.

Figure 7:
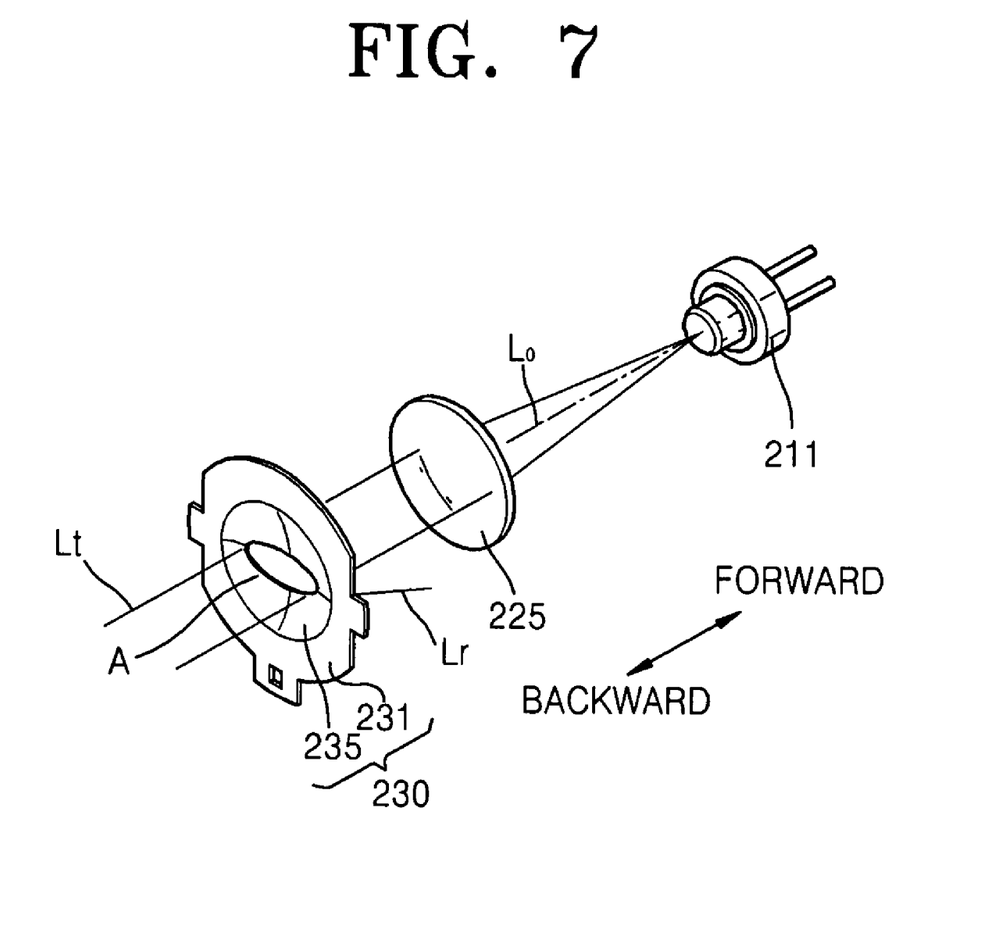
FIG. 7 is a perspective view illustrating optical alignment of a light source unit according to another exemplary embodiment of the present invention.

FIG. 7 is a perspective view illustrating optical alignment of a light source unit according to another exemplary embodiment of the present invention. Referring to FIG. 7, a first lens 225 and an aperture substrate 230 are consecutively arranged along the axis of a light beam emitted from a light emitting device 211. The divergent light beam emitted from the light emitting device 211 is collimated, and the collimated beam emitted is incident on the aperture substrate 230. The aperture substrate 230 includes a curved reflection mirror 235 and a ring-shaped supporting member 231 supporting the curved reflection mirror 235 from the outside. The curved reflection mirror 235 has an opening A that has a greater width in the main scanning direction around the light axis $L_O$, and the curved portion is opened in a predetermined form. In an exemplary embodiment, the curved reflection mirror 235 protrudes to the back of the curved reflection mirror 235, that is, toward the light emitting device 211. Thus, a light beam Lr is reflected from the curved reflection mirror 235 around the opening A travels outwardly from the first lens 225, away from the optical axis $L_O$. The light beam Lt incident on the opening A passes through the opening A with the shape of the opening A, and travels along the light path drawn in FIG. 2 and is scanned onto the photoreceptor.

Figure 8:
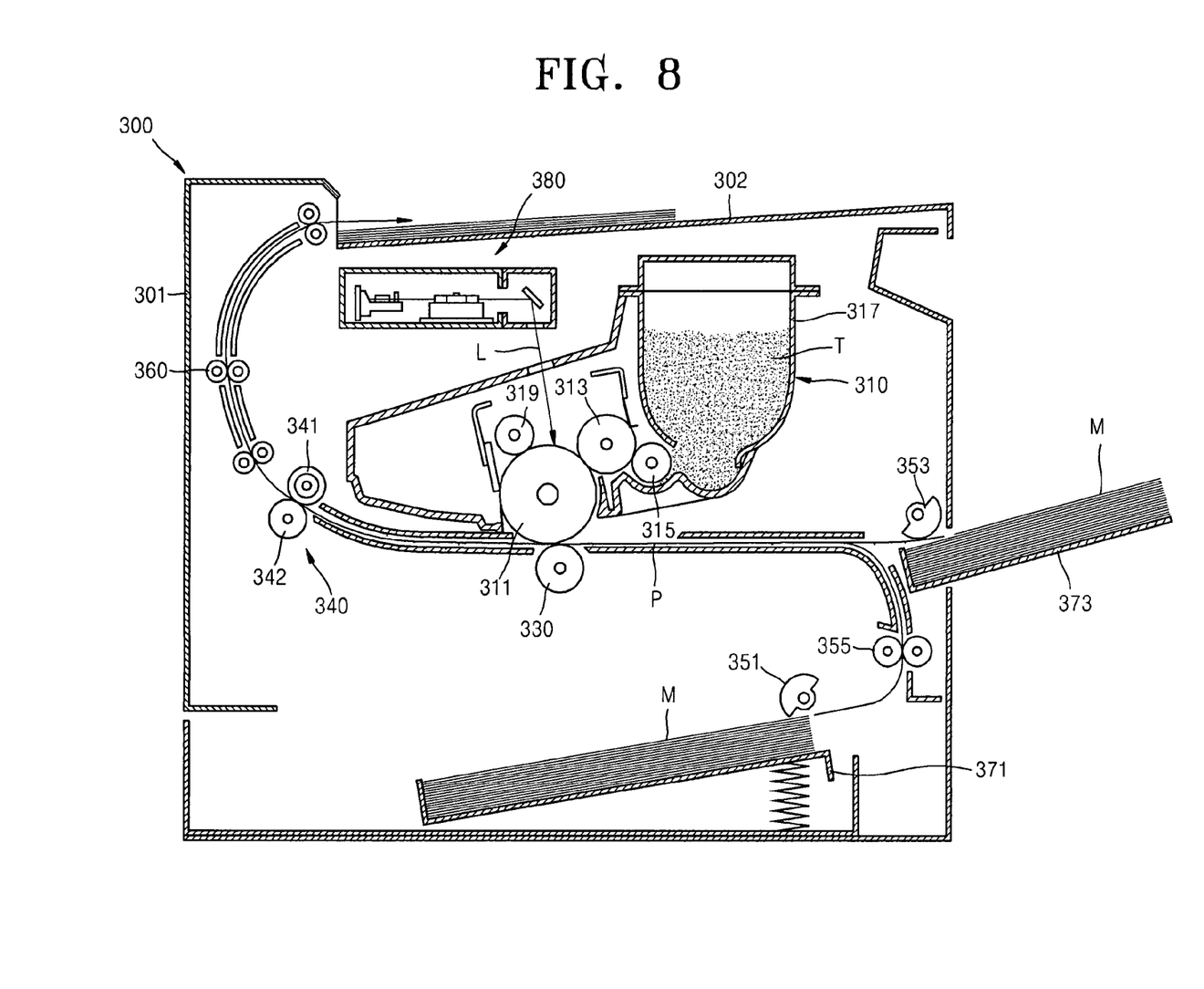
FIG. 8 is an elevational view in cross section of an image forming apparatus having the LSU of FIG. 2.

FIG. 8 is an elevational view in cross section of an image forming apparatus 300 having the laser scanning unit (LSU) of FIG. 2. Referring to FIG. 8, the LSU 380 scans a light beam L into a developing unit 310 and onto a photoconductive drum 311 of the developing unit 310, and forms a latent image on the photoreceptor 311, which is charged to a predetermined potential by a charge roller 319. The developing unit 310 includes the photoreceptor 311 on a circumferential surface of which the latent image is formed by the LSU 380, a developing roller 313 supplying toner T to the photoreceptor 311 and developing a toner image on the photoreceptor 311 corresponding to the latent image, and a supply roller 315 disposed proximal the developing roller 313 to supply toner contained in the toner housing 317 to the developing roller 313.

The photoreceptor 311, on which the toner image is formed, contacts a transfer roller 330 with a predetermined amount of pressure with a printing medium M therebetween. Thus, the toner image on the photoreceptor 311 is transferred to the printing medium M, which passes between the photoreceptor 311 and the transfer roller 330, and follows a transfer path P. The printing medium M is piled in a first feeding tray 371 or a second feeding tray 373 and then picked up piece by piece by a first pick-up roller 351 or a second pick-up roller 353, and supplied to the transfer roller 330. A paper aligner 355 is disposed between the first pick-up roller 351 and the transfer roller 330. The paper aligner 355 feeds and aligns the printing medium so that the toner image may be transferred to a desired location of the printing medium M.

A fuser 340 includes a heat roller 341 and a pressure roller 342 closely contacting each other and rotating in opposite directions to each other. As the printing medium M passes between the heat roller 341 and the pressure roller 342, toner particles that are adhered to the printing medium M are thermally fused by a predetermined amount of heat and pressure. The printing medium M, on which a visible image is fused, passes between a pair of the feeding rollers 360 and is released outside a case 301 onto a tray 302.

The laser scanning unit and the image forming apparatus of the exemplary embodiments of the present invention substantially prevent a decrease in light power and unnecessary remaining images because light reflected during shaping is not incident on the optical elements of the laser scanning unit. Particularly, a curved reflection mirror does not experience concentration of stress during a manufacturing process, thereby reducing the number of defective products.

While the present invention has been particularly shown and described with reference to exemplary embodiments thereof, it will be understood by those of ordinary skill in the art that various changes in form and details may be made therein without departing from the spirit and scope of the present invention as defined by the following claims and their equivalents.

What is claimed is:

1. A laser scanning unit (LSU) for forming a linear latent image by scanning a light beam onto a photoreceptor, the laser scanning unit comprising:
 a light source for generating and radiating a light beam;
 an aperture substrate facing the light source and having a curved reflection surface that includes an opening and faces the light source, for the curved reflection surface reflecting a light beam incident on the reflection surface around the opening away from an incident axis; and
 a beam deflector disposed on an optical path between the aperture substrate and the photoreceptor to deflect a portion of the light beam passing through the aperture substrate and to scan the light in a scanning direction of the photoreceptor.

2. The LSU of claim 1, wherein a shape of the light beam passing through the aperture substrate corresponds to a shape of the opening.

3. The LSU of claim 1, wherein a first lens is disposed on an optical path between the light source and the aperture substrate to collimate divergent light from the light source.

4. The LSU of claim 3, wherein the reflection surface reflects the incident beam so that the reflected light is not incident on the first lens.

5. The LSU of claim 1, wherein the reflection surface is curved away from the light source.

6. The LSU of claim 1, wherein the reflection surface is curved toward the light source.

7. The LSU of claim 1, wherein the reflection has a surface and has a shape of a depressed circle, a radius of the depressed circle is less than a radius of the circle.

8. The LSU of claim 1, wherein the opening extends in the scanning direction of the light beam.

9. The LSU of claim 1, wherein a second lens is disposed on an optical path between the aperture substrate and the beam deflector, the second lens focusing the light beam passing through the aperture substrate onto the beam deflector.

10. The LSU of claim 1, wherein a scanning optical lens is disposed on the optical path between a beam deflector and the photoreceptor, the scanning optical lens focusing the light in the scanning direction with different magnifications to form an image on the photoreceptor.

11. The LSU of claim 1, wherein the opening is substantially elliptical.

12. An image forming apparatus, comprising:
a laser scanning unit to scan a light beam onto a photoreceptor to form a latent image; and
a developing unit to develop the latent image formed on the photoreceptor as a visible image on a printing medium, the laser scanning unit including
a light source unit for providing a light beam; and
a beam deflector disposed on an optical path between the light source unit and the photoreceptor to deflect the light beam from the light source unit and to scan the light beam in a scanning direction of the photoreceptor, the light source unit including
a base frame having a guide channel extending in a direction of light beam propogation;
a circuit substrate coupled to a back of the base frame;
a light emitting device mounted on the circuit substrate for radiating the light beam;
an aperture substrate facing the light emitting device and having a curved reflection surface that has an opening facing the light source, a portion of the light beam incident on the opening passing therethrough, and a remaining portion of the light beam incident on the reflection surface reflecting away from an incident axis; and
a first lens installed on the guide channel between the light emitting device and the aperture substrate to collimate the light beam.

13. The image forming apparatus of claim 12, wherein the first lens is installed on the guide channel by a lens holder that has a shape of a hollow cylinder surrounding the first lens.

14. The image forming apparatus of claim 13, wherein the lens holder is movable along the guide channel.

15. The image forming apparatus of claim 12, wherein the base frame includes a first portion to which the circuit substrate is connected and a second portion in which the guide channel is formed, main surfaces of the first and second portions being substantially perpendicular to each other.

16. The image forming apparatus of claim 12, wherein the reflection surface is curved away from the light emitting device.

17. The image forming apparatus of claim 12, wherein the reflection surface is curved toward the light emitting device.

18. The image forming apparatus of claim 12, wherein the reflection surface has a curved surface in which a first radius of a depressed circle is less than a second radius of an opening circle.

19. The image forming apparatus of claim 12, wherein the opening extends in the scanning direction of the light beam.

20. The image forming apparatus of claim 12, wherein the opening is substantially elliptical.

* * * * *